United States Patent

[11] 3,621,125

[72] Inventor Louis W. Parker
c/o Parker Electronics Inc. 2040 N. Dixie Hwy., Fort Lauderdale, Fla. 33305

[21] Appl. No. 77,831
[22] Filed Oct. 5, 1970
[45] Patented Nov. 16, 1971
Continuation-in-part of application Ser. No. 785,494, Dec. 20, 1968, now abandoned. This application Oct. 5, 1970, Ser. No. 77,831

[54] MUTER FOR TELEVISION RECEIVERS
12 Claims, 2 Drawing Figs.

[52] U.S. Cl. .......... 178/5.8, 325/456
[51] Int. Cl. .......... H04n 5/62
[50] Field of Search .......... 178/5.8, 5.8 A, DIG. 15; 325/456

[56] References Cited

UNITED STATES PATENTS

| | | | |
|---|---|---|---|
| 2,849,529 | 8/1958 | Parker | 178/5.8 |
| 2,943,145 | 6/1960 | Parker | 178/5.8 |
| 3,131,255 | 4/1964 | DiNardo | 178/5.8 |

*Primary Examiner*—Richard Murray
*Attorneys*—William D. Hall, Elliott I. Pollock, Fred C. Philpitt, George Vande Sande, Charles F. Steininger and Robert R. Priddy

ABSTRACT: An intercarrier television receiver is provided with an audio amplifier normally biased beyond cutoff. A tuned circuit, separate from the intercarrier sound system of the receiver, is sharply tuned to the intercarrier frequency for selectively producing a control signal operative to unlock the audio amplifier. Limiters are provided to prevent unlocking of the audio amplifier in response to excessive noise pulses, and to maintain the control signal at a steady value regardless of changes in amplitude of the received signal.

PATENTED NOV 16 1971 3,621,125

INVENTOR
Louis W. Parker

BY

ATTORNEY

MUTER FOR TELEVISION RECEIVERS

CROSS-REFERENCE TO RELATED APPLICATION

This application is a continuation-in-part of my prior copending application Ser. No. 785,494 filed Dec. 20, 1968, for "Muter for Television Receivers" and now abandoned.

BACKGROUND OF THE INVENTION

Various circuits have been suggested heretofore for use in television receivers and operative to reduce or mute sound intensity and/or to darken the picture tube of the receiver when the receiver is detuned. One such arrangement is disclosed, for example, in my prior U.S. Pat. No. 2,912,490 issued Nov. 10, 1959, for "Tuning Indicator and Muter for Television Receivers". While such prior systems have been generally satisfactory, they have been found to exhibit erratic operation in noisy locations due to the fact that noise exhibits broad frequency characteristics and may cause improper unlocking of the muter circuits even though desired picture and sound carrier signals are actually not being received. Adding to this difficulty is the increase in receiver sensitivity in the absence of received signals, due to known automatic gain control operation in the receiver.

The described difficulties have arisen in part since prior muter arrangements, in order to assure that the receiver operates properly when desired signals are in fact received, have employed relatively broadly tuned circuits which exhibit relatively poor noise rejection characteristics. As a result, the muter tends to become extremely sensitive to noise. By way of example, my prior U.S. Pat. NO. 2,912,490 illustrates muter arrangements wherein a biased audio amplifier is used to control sound intensity and picture brilliance as the receiver is tuned through various frequencies. The audio amplifier in this prior patent is biased beyond cutoff and operates, when the receiver is detuned, to mute the sound channel of the receiver while simultaneously darkening the picture tube. This prior arrangement, in one of its forms, responds to a control signal derived from the received picture carrier to unlock the audio amplifier. In an alternative arrangement, this prior circuit, to improve the muting function responds to a pair of control signals derived respectively from the received picture carrier and from the intercarrier sound system of the receiver. In either case, the muter circuit tends to be sensitive to noise since the frequencies used for control purposes must necessarily be selected by relatively broadly tuned circuits in order to assure that the receiver operates properly when desired signals are actually received.

Thus, the 45.75 mc. picture carrier must, in conventional receivers, be selected by circuits which have a tolerance in the order of ± 0.25 mc. to make tuning feasible. This required tolerance in the picture carrier portion of the receiver allows a fairly broad spectrum of noise frequencies to pass; and to the extent that the picture carrier frequency is employed to control muting operations, the system becomes sensitive to noise. This situation is aggravated by the fact that, for operation at relatively high frequencies such as 45.75 mc. it is difficult to design tuned circuits having a narrow (for example 20kc.) bandwidth. The very use of the picture carrier frequency as a control signal therefore makes the muting circuit highly noise sensitive.

Similar problems of noise rejection occur insofar as my earlier circuit contemplated derivation of a control signal from the intercarrier sound system of the receiver. It is of course, possible to tune a circuit operating at 4.5 mc. (the intercarrier frequency) to a narrow band pass (e.g., 20kc.) However, the intercarrier sound system of a television receiver normally requires a band pass of at least 50 kc., and preferably more, to assure proper transmission of the frequency modulated sound carrier. If one derives a muter control signal from the intercarrier sound system itself, therefore, it becomes impractical to restrict the bandwidth of such a control channel, to a point where good noise rejection is achieved.

SUMMARY OF THE INVENTION

The present invention contemplates a muter which is similar to that described in my prior U.S. Pat. No. 2,912,490 in that it employs an audio amplifier which is normally biased beyond cutoff and which is operative to control sound intensity and/or picture brilliance. The audio amplifier is "unlocked" by a control signal which is generated when the receiver is properly tuned to and is receiving picture and sound carriers which are spaced 4.5 mc. apart. The mode of deriving such a control signal differs, however, from that of my prior patent, and the differences are such that highly improved noise rejection becomes possible.

In accordance with the present invention, the control signal is derived from a tuned circuit which is separate from the receiver intercarrier sound system, and which is more sharply tuned to the 4.5 mc. intercarrier frequency than is the intercarrier sound system of the receiver.

Intercarrier sound systems are in themselves well known and are disclosed, for example, in my prior U.S. Pat. No. 2,448,908. Television receivers employing an intercarrier circuit are often termed "intercarrier television receivers" (see e.g. my prior U.S. Pat. No. 2,773,119 and No. 2,912,490), and the term is used in the same way in the present case. Such receivers make use of the television picture carrier and associated sound carrier to produce a frequency modulated signal whose center frequency (or intermediate frequency) is equal to the difference between the two carrier frequencies. This difference frequency is called the "intercarrier frequency" in the instant specification and appended claims, and the intercarrier frequency is used in the present invention to control unlocking of the audio amplifier tube. The intercarrier frequency used for this control function is not derived, however, from the intercarrier sound system itself, but is derived from a completely separate circuit tuned to the intercarrier frequency; and this permits the separate tuned circuit to be far more sharply tuned with consequent better rejection of noise signals.

The control arrangement of the present invention, moreover, uses only the intercarrier frequency taken from a separately tuned circuit for control of the muting operation. By avoiding use of the picture carrier as a control signal, the invention avoids the difficulties and noise rejection problems which have been discussed earlier. At the same time, by using only one frequency for control purposes, rather than two frequencies as was the case in my earlier patent identified above, the overall circuit is far simpler and lower in cost than the circuit of my earlier patent. Prior circuit arrangements also experience considerable difficulty with undesired self-oscillation of the high-gain IF amplifier when its output is connected to various tuned circuits, rectifiers, etc. for control purposes; and the simplified circuit of the present invention avoids this difficulty as well.

The present invention is thus intended to achieve the various advantages discussed above to effect audio muting and/or picture tube brightness control with improved noise rejection. The system to be described does not, in itself, act as a tuning indicator. If it is desired to provide such tuning indication, the circuits of the present invention may be employed in conjunction with arrangements such as have been described in my prior U.S. Pat. No. 2,773,119 issued Dec. 4, 1956, for "Tuning System for Radio and Television Receivers."

DESCRIPTION OF THE PREFERRED EMBODIMENTS

Figures 1, 2:
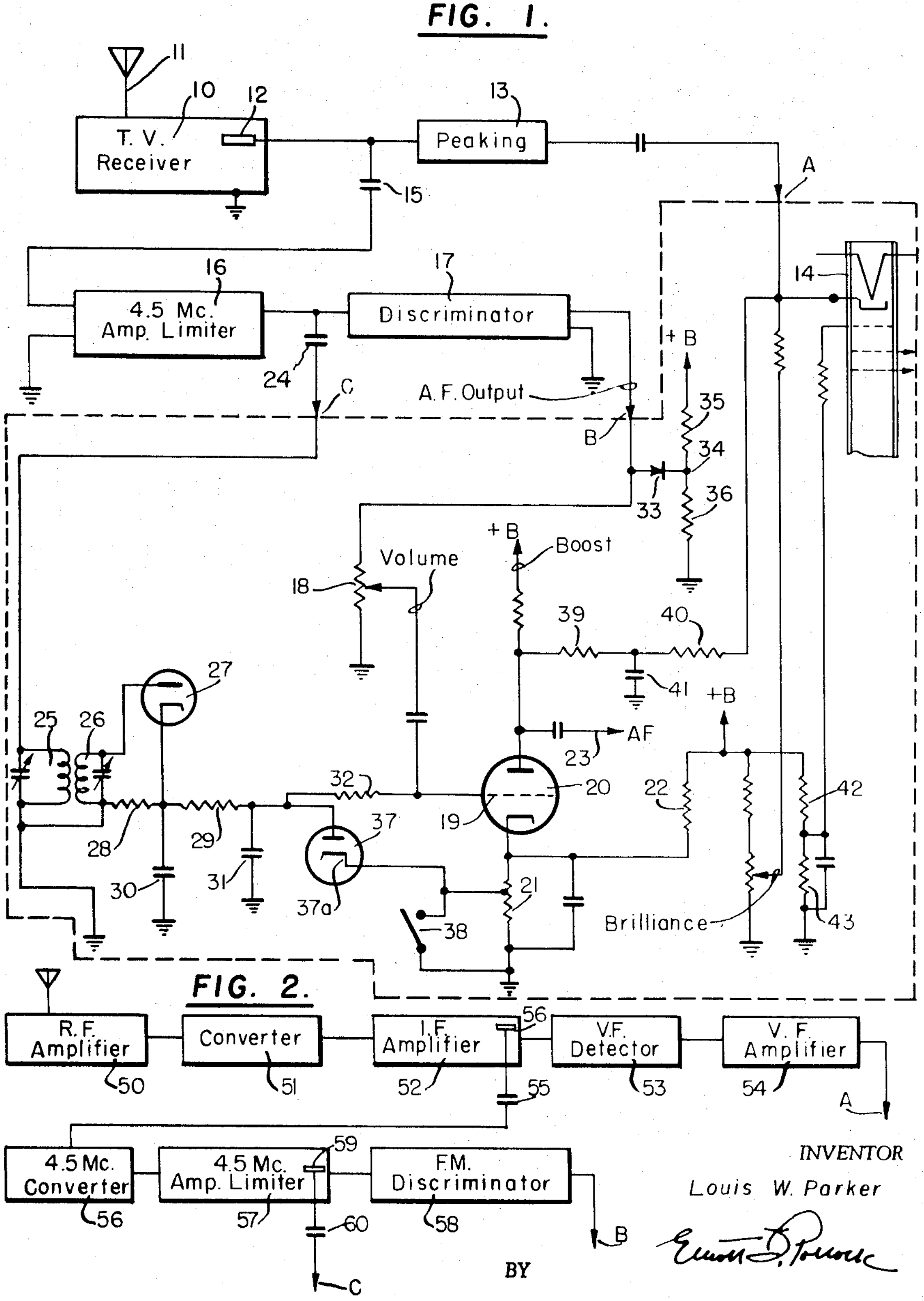
FIG. 1 is a diagrammatic illustration of an improved muter constructed in accordance with the present invention.
FIG. 2 is a block diagram of a modified portion of the circuit shown in FIG. 1 illustrating how the invention may be employed in conjunction with color television receivers.

A primary purpose of the present invention resides in the provision of an improved arrangement for deriving a control voltage for a muter circuit. The control voltage is taken from a tuned circuit which is separate from and more sharply tuned than the receiver intercarrier sound system. This separate circuit is operative to reduce noise effects by making use of the accurate and unchanging frequency difference of 4.5 mc. between the picture and sound carriers, to which intercarrier frequency the separate circuit is permanently tuned. This frequency difference is customarily held within a few kilocycles by the transmitting station even at ultra high frequencies. The separate tuned circuit takes the form of a circuit having a very high Q, or a plurality of circuits having moderate Q, and exhibits very narrow bandwidth since it need not pass modulations constituting the received audio information. It is well known that noise voltage reduces as the square root of bandwidth; and by using such a sharply tuned circuit to derive a control signal, therefore, excellent noise rejection becomes possible in the control channel of the muter.

The 4.5 mc. intercarrier signal is generated within the receiver by heterodyning of the picture and sound carriers when both of these carriers are being received. The modulated intercarrier signal is transferred through the relatively broadly tuned intercarrier sound system of the receiver to an input of a normally inoperative audio amplifier; and a control signal, also at the intercarrier frequency, is derived in a separate, more sharply tuned circuit operative to unlock said audio amplifier so as to permit normal reproduction of the sound signals. When either or both of the picture and sound carriers are missing, noise frequencies take their place; but any noise signals which occur at a frequency of 4.5 mc. in the amplifier input control and/or sound channels, as a result of heterodyning of these noise frequencies, are normally too low in amplitude to unlock the muting circuit. In order to render the circuit insensitive to even very high-amplitude noise pulses which might happen to be present in the sound input channel to the audio amplifier, an amplitude limiter is preferably provided between the output of the discriminator in the sound channel and the input to the muted audio amplifier. Another limiter is also preferably provided in the control input channel to the amplifier to limit any control potential to a steady value regardless of the amplitude of the signal being received by the receiver.

The foregoing features will become more readily apparent from examination of FIG. 1. A conventional television receiver 10 comprises tunable signal translating circuits of conventional configuration adapted to operate upon spaced picture carrier and sound carrier signals received at antenna 11. The final output video amplifier stage of the receiver 10 has its plate 12 coupled via any conventional peaking circuit 13 to a point A connected to the cathode of cathode-ray picture tube 14. Some of the 4.5 mc. signal appearing at the video amplifier plate 12 is also coupled through a low capacity condenser 15 to the input of a 4.5 mc. limiter amplifier 16 the output of which is in turn coupled to a discriminator 17. Stages 16 and 17 operate conventionally and comprise an intercarrier sound system operative to produce an audio frequency signal at point B, which audio frequency signal is developed across the resistive portion of a potentiometer 18 operating as a volume control and coupled thereby to the grid 19 of an audio frequency amplifier stage 20.

Amplifier 20 is rendered normally inoperative by a bias applied to its cathode circuit from voltage divider 21, 22 connected as shown, but alternative forms of bias can be employed for this purpose. The term "inoperative" as employed herein, and in the appended claims, is intended to refer to a situation wherein tube 20 is biased past its plate current cutoff, but also includes situations wherein the gain of the tube is reduced to the point where it either eliminates or substantially reduces the level of audio frequency signal available at its anode output line 23. Line 23 is in turn coupled to the input grid of an AF amplifier (not shown) which in turn feeds the sound producing means. With amplifier stage 20 in its normally inoperative condition, the audible sound produced is either eliminated or significantly reduced in volume below the desired volume selected by potentiometer 18.

A further portion of the 4.5 mc. signal appearing at the output of limiter amplifier 16 is coupled via a further low capacity condenser 24 to an input point C and thence to tuned circuits 25 and 26. Capacitors 15 and 24 have parameter values in the order of 3 micro micro farads. Tuned circuits 25 and 26 are sharply tuned to the intercarrier frequency of 4.5 mc. and have a substantially narrower bandwidth than that of the intercarrier sound system 16, 17 of the receiver, for the purposes already described. The narrower the bandwidth of circuits 25 and 26, the less will be the noise level at the output of those circuits.

A rectifier 27 is coupled to tuned circuits 25 and 26 and converts the 4.5 mc. output of tuned circuit 26 to direct current. Resistors 28 and 29 together with capacitors 30 and 31 filter this rectified output and apply it via resistor 32 as a positive bias to audio frequency amplifier tube 20. Amplifier tube 20 has a sharp cutoff characteristic and, as already described, is biased past its plate current cutoff by the cathode biasing arrangement consisting of resistors 21 and 22. The rectified 4.5 mc. voltage obtained through resistors 29 and 32 operates to overcome the effect of the high-negative bias applied to audio stage 20 so as to permit normal operation of that audio stage.

By reason of the arrangement described, audio stage 20 becomes operative only when a set of carrier frequencies 4.5 mc. apart reach the input of receiver 10, and the receiver is tuned to those frequencies. If a 4.5 mc. signal alone should be received by the receiver 10, the receiver operates to reject that signal. Moreover, due to the fact that tuned circuits 25 and 26 are separate from the intercarrier sound system 16, 17, said circuits 25, 26 can be far more sharply tuned to the intercarrier frequency in order to derive a more noise-free control signal for amplifier 20, without disturbing the normal operation of sound system 16, 17.

In very noisy locations, it is possible that, when the receiver is not receiving any signal, excessive noise may be rectified by rectifier 27 to produce a DC potential having a magnitude sufficient to momentarily "unlock" amplifier stage 20. This is not the case, of course, in average locations although some higher noise pulses may still come through at a much reduced volume. To improve this situation, a further rectifier 33 is added between the output of discriminator 17 and the input to audio stage 20 to clip any noise pulses which may be present at a level determined by the potential at a point 34 obtained from a voltage divider 35, 36. The voltage at which clipping occurs in diode 33 is selected to be higher than the highest audio frequency voltage which is otherwise likely to reach amplifier 20.

Inasmuch as the DC control potential available to unlock amplifier 20 varies in amplitude depending, among other things, on the intensity of the signal received at antenna 11, it is preferable to provide means operative to limit the control voltage at the grid 19 of amplifier 20 to a steady value regardless of the amplitude of the received signal. It may be noted that this feature operates in conjunction with the usual automatic gain control present in the receiver. To effect such operation, a diode 37 is provided which is operative to clip or limit the DC control signal at a predetermined amplitude. Cathode 37*a* of diode 37 is set a few volts below the cathode potential of audio amplifier 20 by connecting said cathode 37*a* to a tap on the audio amplifier cathode resistor 21 thereby to supply the desired clipping potential for diode 37.

If the signal received at antenna 11 has a very low amplitude, there may not be sufficient control voltage generated to unlock the muter circuit. To obviate this difficulty, a switch 38 is connected as illustrated between ground and the cathode 37*a* of diode 37, and across a portion of cathode resistor 21. When switch 38 is closed, it alters the bias on amplifier 20 to a value such that the amplifier operates in normal fashion without performing a muting function.

In addition to muting unwanted sounds, the arrangement of FIG. 1 may also be employed to darken the screen of cathode-ray tube 14 when improper signals are being received. When tube 20 is in its "inoperative" condition, for example when no television signals are being picked up, the potential at the anode of tube 20 rises. This potential is applied through a filter network 39, 40, 41 to the cathode of picture tube 14. If the picture tube cathode potential is raised sufficiently, this will darken the picture tube. In order to have a sufficiently high potential to shut off the beam current of picture tube 14, it is preferable to apply a higher plate potential than is customary to audio amplifier 20. Such a higher potential is obtainable from the "boost" potential in most television receivers, with the boosted potential being obtained by rectifying some of the horizontal sweep retrace voltage.

In order that sound be cut off, the plate current of audio amplifier tube 20 must be nearly zero. In the absence of other considerations, and with the arrangement thus far described, the cathode-ray tube would be already dark before sound is completely cut off. To bring these two conditions into balance, a moderate positive bias is preferably applied to the first grid of picture tube 20 by means of a voltage divider network 42, 43.

In some receiver arrangements, e.g. in many known color receivers, the 4.5 mc. signal is obtained by removing the picture and sound I.F. carriers ahead of the picture detector and applying then to a separate heterodyne detector. Such a system nevertheless lends itself to the improved muting operation of the present invention, and is illustrated in block diagram form in FIG. 2. The block diagram of FIG. 2 illustrates only those parts which are changed from the parts already described in FIG. 1; and the parts which are common to both systems are surrounded by a broken line in FIG. 1. The three points A, B, C previously described in reference to FIG. 1 represent entrance points for the three signals feeding the control arrangement within the broken line of FIG. 1, and these three entrance points have been designated by like references A, B, C in FIG. 2.

The receiver shown in FIG. 2 comprises an R.F. amplifier stage 50 coupled to a converter 51 which is in turn coupled to I.F. amplifier stages 52. The last such I.F. stage is then coupled to a video frequency detector 53 and to a video frequency amplifier 54 to provide picture signals at point A. The picture receiver portion thus described is conventional, except that a low-capacity condenser 55 is connected to the plate 56 of one of the I.F. stages in amplifier 52, and operates to remove some of the I.F. signal and feed it to a 4.5 mc. converter 56 to generate the 4.5 mc. sound signal. The sound signal produced by converter 56 is amplified by limiter amplifier 57 and is then fed to F.M. discriminator 58 so as to supply the desired audio frequency signal at point B. A portion of the 4.5 mc. signal from amplifier 57 can be coupled from the plate 59 of the amplifier tube through a capacitor 60 to point C and thence to the tuned circuits 25 and 26 of FIG. 1.

In each of FIGS. 1 and 2 the 4.5 mc. signal supplied to the sharply tuned circuits (such as 25, 26) is preferably obtained, as shown, through a limiter amplifier (such as 16 or 57). This reduces the effect of atmospheric disturbances since, by that arrangement, less of any high-amplitude sharp pulses will be rectified by rectifier 27.

The particular coupling arrangements shown in FIGS. 1 and 2 operate reasonably well and have been selected primarily because of their simplicity. It must be understood, however, that any other suitable coupling methods may be used in their place.

While I have thus described preferred embodiments of the present invention, many variations will be apparent to those skilled in the art. It must therefore be understood that the foregoing description is intended to be illustrative only and not limitative of my invention, and all such variations and modifications as are in accord with the principles described are meant to fall within the scope of the appended claims.

Having thus described my invention, I claim:

1. In a television receiver, signal translating means tunable to receive picture carrier and sound carrier signals spaced from one another by an intercarrier frequency, sound producing means, first tuned circuit means coupled to said signal translating means and tuned to said intercarrier frequency for producing a frequency modulated audio signal upon reception of said spaced picture and sound carrier signals, first coupling means including a normally inoperative amplifier for coupling said first tuned circuit means to said sound producing means, second tuned circuit means coupled to said signal translating means and tuned to said intercarrier frequency for producing a control signal upon reception of said spaced picture and sound carrier signals, the bandwidth of said second tuned circuit means being less than the bandwidth of said first tuned circuit means, and second coupling means coupling said control signal to said amplifier for rendering said amplifier operative.

2. The combination of claim 1 wherein said first coupling means includes a signal amplitude limiter between the output of said first tuned circuit means and the input of said amplifier.

3. The combination of claim 1 wherein said second coupling means includes a signal amplitude limiter between the output of said second tuned circuit means and said amplifier.

4. The combination of claim 3 including means for selectively rendering said signal amplitude limiter inoperative.

5. The combination of claim 1 wherein said first and second coupling means respectively include first and second signal amplitude limiters.

6. The combination of claim 1 including picture producing means, and control means responsive to the presence and absence of said control signal for controlling the brightness of said picture producing means.

7. The combination of claim 1 wherein said normally inoperative amplifier includes an amplifier stage, bias means providing a potential operative to normally bias said stage beyond cutoff, and means responsive to occurrence of said control signal for producing a control potential effectively opposing the operation of said bias means.

8. In a television receiver of the type comprising tunable signal translating means responsive to the reception of picture carrier and sound carrier signals spaced from one another by an intercarrier frequency for supplying video signals to a picture producing means and including an intercarrier sound system for supplying frequency modulated sound signals to a sound producing means, said receiver also including a normally inoperative amplifier circuit for rendering at least said sound producing means inoperative in the absence of a control signal applied to said amplifier circuit, the improvement which comprises tuned circuit means coupled to said signal translating means for selectively producing said control signal, said tuned circuit means being separate from said intercarrier sound system and being sharply tuned to said intercarrier frequency, and means coupling output signals from said tuned circuit means to said amplifier circuit for providing the sole control signal rendering said amplifier circuit operative upon reception of said spaced sound and picture carrier signals.

9. The combination of claim 8 wherein said coupling means includes limiter means for limiting the amplitude of said control signal to a predetermined level regardless of the amplitude of said picture and sound carrier signals.

10. The combination of claim 9 wherein said intercarrier sound system includes a limiter amplifier, said tuned circuit means being coupled to said limiter amplifier and deriving a signal from said limiter amplifier for producing said control signal.

11. The combination of claim 8 including means responsive to the presence and absence of said control signal for controlling the brightness of said picture producing means.

12. The combination of claim 8 wherein said amplifier circuit and said sound producing means cooperate to selectively mute the sound in said television receiver, means responsive to the presence and absence of said control signal for selectively darkening the picture produced by said picture producing means, and bias potential producing means coupled to said picture producing means for synchronizing said sound muting with said picture darkening.